No. 676,339. Patented June 11, 1901.
H. F. PARSHALL.
SYSTEM OF DISTRIBUTION.
(Application filed Jan. 23, 1901.)
(No Model.)
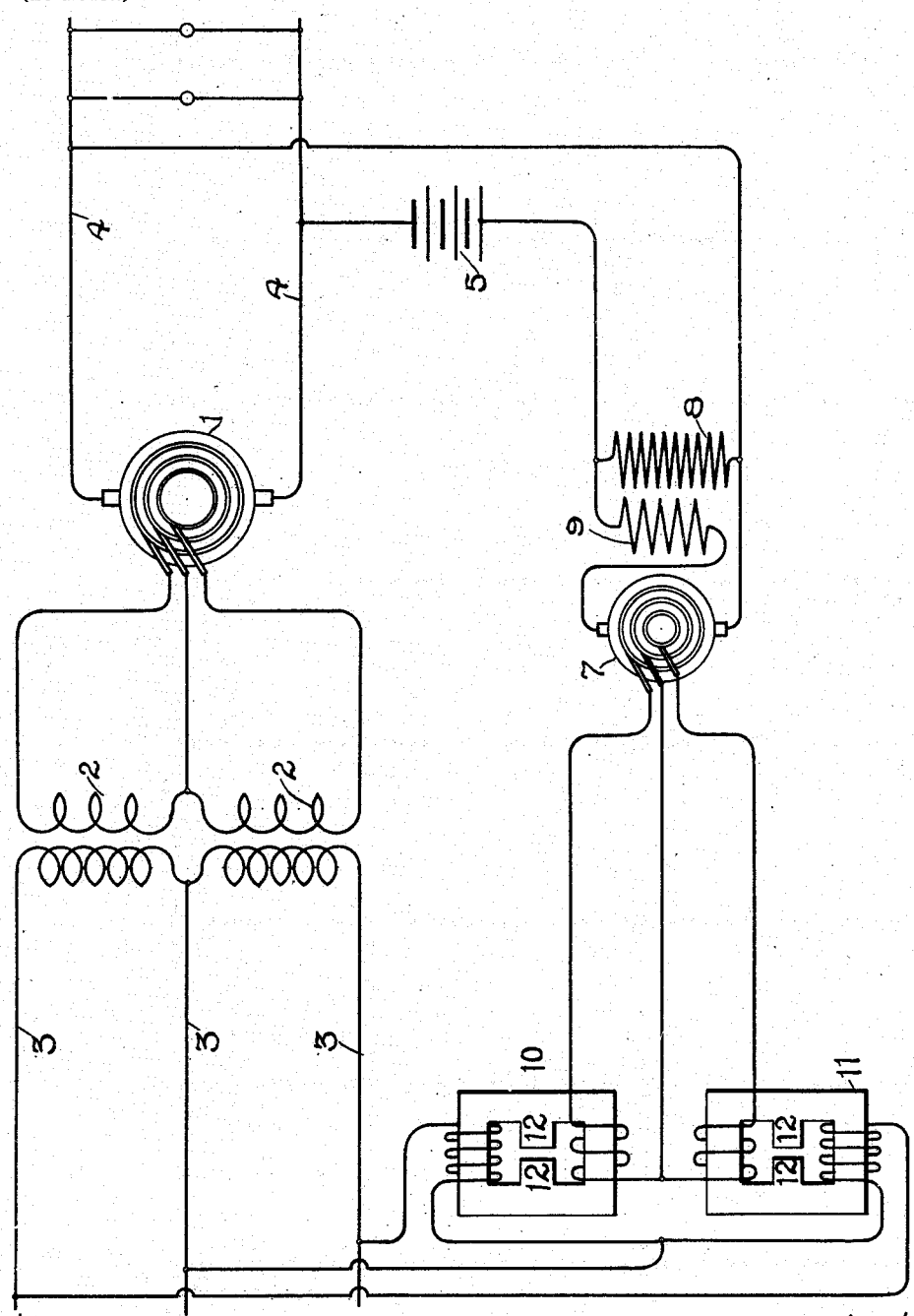
WITNESSES.
Edw. Williams, Jr.
A. F. Macdonald.
INVENTOR
Horace F. Parshall,
by Albert G. Davis
Atty.

UNITED STATES PATENT OFFICE.

HORACE F. PARSHALL, OF LONDON, ENGLAND, ASSIGNOR TO GENERAL ELECTRIC COMPANY, OF NEW YORK.

SYSTEM OF DISTRIBUTION.

SPECIFICATION forming part of Letters Patent No. 676,339, dated June 11, 1901.

Application filed January 23, 1901. Serial No. 44,361. (No model.)

*To all whom it may concern:*

Be it known that I, HORACE F. PARSHALL, a citizen of the United States, residing at London, England, have invented certain new and useful Improvements in Systems of Distribution, (Case No. 1,053,) of which the following is a specification.

My present invention relates to the regulation of electric circuits.

One object of the invention is to obtain a current of variable electromotive force suitable for charging storage batteries, in which as the charging proceeds it is desirable that the charging electromotive force should increase in order to compensate for the increasing electromotive force of the battery. I attain this object by making use of a rotary converter having a series winding arranged so as to act in opposition to the shunt exciting-winding, this converter being supplied from an inductive alternating-current system. If, for example, the current supplied by the rotary converter tends to diminish, the demagnetizing effect of the series winding is decreased, thereby causing a resultant increase in field strength of the converter. This increased excitation advances the phase of current supplied to the converter, which by reacting upon the inductive supply-circuit increases the electromotive force at the alternating-current terminals of the converter and so correspondingly increasing the direct-current electromotive force. The converter thus has a tendency toward constant-current regulation rather than toward constant-potential regulation.

My invention may be applied in a number of different ways—as, for example, in the manner shown in the accompanying drawings, in which I make use of a regulating rotary converter as a booster. This particular application of my invention, together with its various features of novelty, will be set forth in the following description and claims.

In the drawings I have illustrated a rotary-converter system consisting of a rotary converter 1, fed through step-down transformers 2 from an alternating-current-supply system 3, the direct-current terminals of the converter being connected to a distribution system of any suitable character, the supply-mains of which are shown at 4. Among other translating devices which may be fed from this direct-current system is the storage battery 5, connected across the mains 4. In order to provide a suitable rise in voltage of the current supplied to this battery as the charging of the same proceeds, I include in circuit therewith an auxiliary rotary converter 7, this converter being arranged with series and shunt windings, as already described. The shunt-winding of the converter is indicated at 8 and the series winding at 9, this latter winding being connected so as to act in opposition to the shunt-winding 8.

The direct-current terminals of the auxiliary or booster rotary converter 7 are supplied with current derived indirectly from the alternating-current mains 3 through the medium of transformers 10 and 11, these transformers being specially constructed so as to have considerable leakage between the primary and secondary winding. By reason of this construction the transformer-circuit will have considerable inductance. If desired, however, the transformers may be of ordinary character, the inductance being furnished by separate inductance-coils in series with the mains. In the transformers 10 and 11 the leakage taking place between the primary and secondary windings of each transformer is facilitated by means of the opposing projections 12, the construction being similar to that used in the well-known type of leakage-transformer.

Supposing the battery 5 to be connected across the mains 4, the charging-current will then commence to flow into the same, and the voltage of the battery will slowly rise. As this voltage rises the current tends to decrease, thereby decreasing the counter-magnetizing effect of the series winding 9 of the boosting-converter 7, the voltage of which is thereby increased. The charging-current of the battery is thus maintained at proper value throughout the whole period of charging instead of decreasing, as would be the case if the electromotive force of the charging-current were constant.

It is obvious that various modifications and applications of the invention may be made without departing from the spirit thereof, for which reason I do not wish my claims to be limited to the specific construction shown.

What I claim as new, and desire to secure by Letters Patent of the United States, is—

1. The combination of a direct-current circuit, a rotary converter connected to said circuit so as to act as a booster, and means responsive to current in said circuit for varying the electromotive force of the rotary converter.

2. The combination with an alternating-current circuit possessing inductance, a rotary converter connected to said alternating-current circuit and means for automatically causing the field excitation of the converter to decrease as the current furnished by the converter increases.

3. The combination of an alternating-current circuit possessing inductance, a rotary converter connected to said circuit, a circuit including a storage battery also connected to said circuit, and means controlled by current in the storage-battery circuit for varying the electromotive force of the rotary converter inversely with the variation of current in said storage-battery circuit.

4. The combination of alternating-current mains and direct-current mains linked together through the medium of a dynamo-electric machine, and a circuit connected across the direct-current mains and including the direct-current end of a rotary converter the alternating-current end of which is connected to said alternating-current mains.

5. The combination of an alternating-current circuit, a rotary converter connected to said alternating-current circuit, a load for the direct-current circuit of the rotary converter, and means responsive to the current supplied to said load for varying the electromotive force of the converter inversely with the variation of the current supplied to said load.

6. The combination of a direct-current circuit including a storage battery, and a rotary converter connected in said circuit so as to act as a booster.

7. The combination of a direct-current circuit including a storage battery or other translating device, a rotary converter with its direct-current end connected in said circuit, and means responsive to current in said circuit for varying the electromotive force of said rotary converter.

8. The combination of an alternating-current system, means for changing alternating current into direct current and supplying said direct current to a direct-current system, and supplemental means for supplying a regulating-voltage to the direct-current system, said supplemental means receiving current from said alternating-current system.

9. The combination of a direct-current circuit, and a rotary converter connected in said circuit so as to act as a booster.

In witness whereof I have hereunto set my hand this 21st day of January, 1901.

HORACE F. PARSHALL.

Witnesses:
BENJAMIN B. HULL,
MARGARET E. WOOLLEY.